United States Patent [19]

Clark et al.

[11] Patent Number: 5,361,356
[45] Date of Patent: Nov. 1, 1994

[54] STORAGE ISOLATION WITH SUBSPACE-GROUP FACILITY

[75] Inventors: Carl E. Clark, Poughkeepsie; Jeffrey A. Frey, Fishkill; Kenneth E. Plambeck; Casper A. Scalzi, both of Poughkeepsie; Bhaskar Sinha, Wappingers Falls, all of N.Y.

[73] Assignee: International Business Machines Corporation, Armonk, N.Y.

[21] Appl. No.: 847,521

[22] Filed: Mar. 6, 1992

[51] Int. Cl.⁵ .............................................. G06F 9/40
[52] U.S. Cl. .................................. 395/700; 395/375; 364/DIG. 1; 364/280; 364/262.4; 364/261.3; 364/261.9; 364/256.3
[58] Field of Search ..................... 395/700, 650, 375

[56] References Cited

U.S. PATENT DOCUMENTS

| | | | |
|---|---|---|---|
| 4,355,355 | 10/1982 | Butwell et al. | 395/400 |
| 4,943,913 | 7/1990 | Clark | 395/700 |
| 4,945,480 | 7/1990 | Clark et al. | 395/700 |
| 5,159,677 | 10/1992 | Rubsam et al. | 395/425 |
| 5,220,669 | 6/1993 | Baum et al. | 395/775 |

Primary Examiner—Kevin A. Kriess
Attorney, Agent, or Firm—Bernard M. Goldman

[57] ABSTRACT

A Branch in Subspace Group (BSG) instruction is executed in problem state (for example by an application program) for providing a fast instruction branch between address spaces within a restricted group of address spaces called a subspace group. The subspace group contains two types of address spaces: a base space and any number of subspaces. The subspace group is set up in a control table associated with each dispatchable unit (DU). This DU control table contains: an identifier of a base space, an identifier of an access list that contains identifiers of all subspaces in the subspace group, an indicator of whether CPU control was last given to a subspace or to the base space, and an identifier of a last entered subspace in the group. The BSG instruction has an operand defining a general register containing the target virtual address and an associated access register containing an access-list-entry token (ALET) defining the target address space. The ALET indexes to a target subspace identifier in the access list, and then the associated virtual address locates the target instruction in the identified target address space. BSG instruction execution controls restrict the BSG branching only to an instruction in the subspace group.

15 Claims, 8 Drawing Sheets

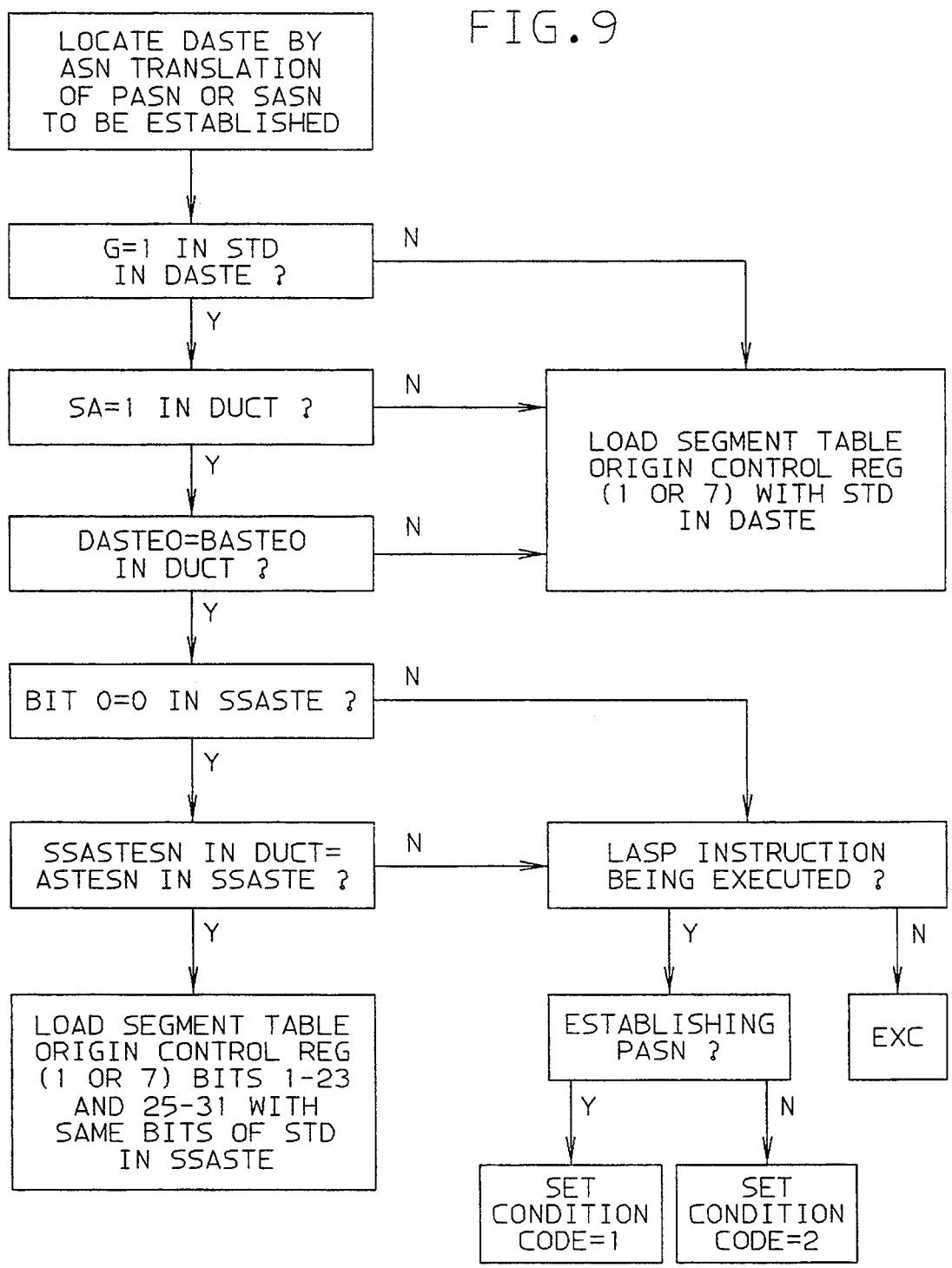
FIG. 9
FIG. 7
SEGMENT-TABLE DESIGNATION (STD)
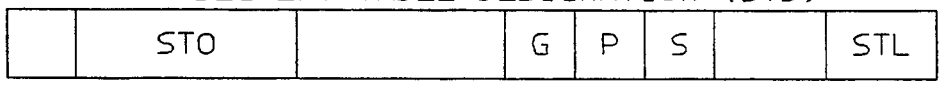
G=1 ⇒ ADDRESS SPACE SPECIFIED BY STD
IS IN A SUBSPACE-GROUP

STORAGE ISOLATION WITH SUBSPACE-GROUP FACILITY

INTRODUCTION

This invention enhances the reliability of computer system operation by isolating data (including programs) in virtual subspaces from programs in other virtual subspaces in the same subspace group. Virtual addressing translation tables respectively define the different subspaces as well as the address space of their base space. The base address space has addressability to the subspaces by having translation tables with common translation table entries. Thus, a program execution in the base space has predetermined addressability to its subspaces, but a program in a subspace does not necessarily have addressability to any other subspace or to all the addresses of the base space. Such addressability isolation protects subspace data and programs from inadvertent accesses (fetches and stores) by other subspaces. The addressability scope and hence the addressability isolation of the subspace is established by the common translation table entries in the base space which it exclusively shares with the subspace.

BACKGROUND

It is common in the prior art to have a family of programs and data that are intertwined in their relationship and their execution, such that a high rate of switching is essential among the different programs and there is shared use of the data bases in the family. Such a family of programs and data are often supported by a software subsystem (operating under an operating system). The subsystem often handles a large number of transactions that are concurrently accessing a large number of different programs and data bases in the family. For example, the concurrent transactions of banking tellers (both humans and machines) in a multibranch banking complex may concurrently use deposit programs and withdrawal programs (that share the same data base, i.e. customer accounts), credit check programs and their data bases, and numerous other related banking programs and data bases, which are being accessed concurrently by a set of transaction programs invoked by individual requests for service.

Such a family of programs and data have been found to be usable at their fastest potential rate when they are all in a single address space (AS) being accessed from one or more CPUs. However, subsequent experience has indicated significant failures in the execution of such programs, due to incorrect store operations by any executing program wiping out part of another or a data base. Such execution failures have temporarily terminated the operation of a multi-branch banking business dependent on such a system. A programming system failure that causes a temporary outage of an entire business is usually considered a non-tolerable option, regardless of its speed of operation.

Because of the gravity of such incorrect stores, it has been necessary to adopt more stringent testing methods, involving more calendar time and CPU usage, to increase assurance that most errors have been removed from application codes that are executed on behalf of transactions.

An obvious way to prevent such program failures is to isolate the different programs and data bases from each other in their system, so that one program cannot access any other program or data base in the system. This isolation should be done such that any store outside the anticipated scope of a particular transaction will be caught by the processor when it is attempted, not allowing the incorrect store to occur. The incorrect store can then be reported to the operating system which notifies the base subsystem controlling the family of transaction applications that the transaction should be aborted. An error message can result in the timely correction of the faulty program. The subsystem remains in full operation controlling the other transactions underway. Only one transaction is aborted, the installation is notified, the incorrect store is avoided, and no other transaction or data is affected in anyway.

A prior protection technique for programs executing with virtual addresses is to isolate different programs and their data in different address spaces. That is, a program executing in one address space cannot cause an incorrect store effecting the programs and data in any other address space.

The prior art discloses two types of virtual address spaces, each of which represents a sequence of virtual addresses and has the isolation characteristic. They are: 1. A program address space (herein called a "program space"); and 2. A data address space (herein called a "data space"). Both types of address spaces are specified in a computer system by an ASN-second-table-entry (ASTE).

Each type of address space is defined in a computer system by a "translation table designation" (TTD) which contains a "translation table origin" (TTO) and a "translation table length" (TTL). The TTO locates the translation table in system main memory, and the TTL specifies the length of the translation table by its number of entries. In the System/370 and ESA/390 architectures, which use a two level translation operation, the TTD containing a TTO and TTL are respectively represented as the STD (segment table designation) containing the STO (segment table origin) and the STL (segment table length). In a computer architecture using a single level translation operation, the TTD, TTO and TTL may be respectively represented by a PTD (page table designation) containing a PTO (page table origin) and a PTL (page table length).

In the ESA/390 architecture, each program space also has a unique ASN (address space number) assigned to it, whereas a data space does not have an assigned ASN. A program space contains executable code, and may also contain data. A data space only contains data, and does not contain executable code, but unexecutable code may be included as data. The architecture and operating system prevent instructions from being executed in a data space.

Complex procedures are involved when a non-supervisory program must switch from one program address space to another program address space to call another program. One technique is to use the ESA/390 "program call with space switching" (PC-ss) instruction that has a PC number as an operand. The PC number must first go through a PC number translation for being translated to an ASN (address space number). Then the PC instruction goes through ASN translation for being translated to an STD (segment table designation). The multiple translations of the complete PC instruction go through the numerous different types of authority checks to assure the integrity of the data in the system.

The PC-ss was disclosed and claimed in U.S. patent application Ser. No. 07/732,936 (PO984011) entitled "Linkage Mechanism for Program Isolation" filed Jul. 19, 1991 which is a continuation of U.S. application Ser. No. 07/154,733 filed Feb. 10, 1988 which are assigned to the same assignee as the subject application. The entire contents of application Ser. Nos. 07/732,936 and 07/154,733 are incorporated by reference into the subject application.

The complete PC instruction does not use ART (access register translation), which is only used for data accesses in the ESA/390 architecture. The ART process translates an ALET in an access register (AR) to an STD.

Both the PC translation and ART translation processes use an ASN second table entry (ASTE) each of which contains an STD currently recognized by the computer system. The ART process does not use any ASN to locate its accessed ASTE. An ASTE used by the ART process is called a "psudo-ASTE" if it is not designated by an ASN, which is the case when it represents a data address space. Any ASN designating an ASTE is only used for ASN translation, which is done by program call (PC) and related types of instructions, and the LASP (load address space parameters) instruction.

This invention substitutes a modified ART type of translation for ASN translation when making a program call within a family group of address spaces. The modified ART translation process is much less involved than the complete PC translation process by taking advantage of the relationship between the subspace and its basespace in the group to eliminate most of the authority checks used by the complete PC instruction. Nevertheless, the PC authority checks are still required, depended upon, and done when the family group is initially dispatched or when control is transferred to a program space outside the family, or is returned to the family from a program space outside the family group. This invention eliminates having to repeat all of the authority checks after the dispatch process for each time an address space is switched within a group.

Another way to isolate programs and data in storage is to use storage key protection, which is assignable to 4 KB blocks in real or absolute main storage. Only a limited number of storage keys are available (e.g. 16 keys). The isolation between storage blocks assigned different storage keys can require very high key-management overhead involving supervisory (privileged program) control to switch a problem-state program request for a key switching from one storage block having one storage key to another block having another storage key. (Only the supervisory key, key 0, has access to other key areas without performing specific PSW access key management. However, isolation between the different key storage areas is lost while the supervisory key is being used, so that it cannot be used by problem state application programs).

For example, if non-supervisory keys are assigned to first and second blocks, and a program in the second block needs to access data in the first block, the key to the first block may be assigned temporarily to the program in the second key block to allow it to access the first key block. Thus, a significant amount of system overhead is required to assign and unassign the key to that program, involving an interruption in the program's operation while an operating system supervisory program changes the key assignments. Storage key assignment operations are so security sensitive that they generally are done only by the main operating system program. Accordingly, storage key switching may be useful only where very little or no program switching, or communication, between blocks assigned different keys, is required.

A program may be authorized to use more than one access key, but it then must manage the switching of the PSW access key values by use of an instruction in ESA/390 such as Set PSW Key From Address (SPKA).

Key protection requires the initialization of the access and storage keys involved, as well as special storage key hardware arrays to store the keys for all 4 KB blocks in the memory. A program's access key is specified by a field in the PSW (program status word) under which the program is executed. A storage key is associated with each block of real storage. Key protection can permit multiple levels of access authority to be used within a single program. The program may be given the capability to access more than one key. This capability is provided by a control register field called the PKM (program key mask), initialized by an operating system for the task to be executed. However, in general, only one access key value may be in use at any time. (A small set of instructions exist in the ESA/390 architecture for moving data from one location in storage to another which allow a separate protection key for each operand. One key is the PSW key; the other key must be authorized by the PKM in problem state, or implicitly allowed by executing in supervisor state.)

Key protection may apply to programs executing in the same address space or in another address space. Thus, key protection can complement address space protection, since these different forms of isolation have different characteristics.

The use of a "public storage key" (PSK) provides a partial solution to addressing isolation within a related group (family) of programs and data by eliminating the need for key management under limited circumstances. The public storage key provides unidirectional access for programs to storage blocks assigned the PSK. That is, the use of the PSK can protect all blocks of storage assigned any key, other than the PSK, from wild stores caused by programs executing under the access authority of the PSK, while allowing public access by all programs assigned any key to storage blocks assigned the PSK. The PSK is disclosed and claimed in U.S. patent application Ser. No. 07/710,875 (PO991016) entitled "Storage Protection Utilizing Public Key Control" filed Jun. 6, 1991 which is assigned to the same assignee as the present application, and is incorporated herein by reference.

An advantage in using the PSK is that it can eliminate the need for key management programming in certain situations. Without any key switching control, the PSK can protect data and programs in storage blocks assigned the supervisory key or any non-supervisory key from being changed by programs executing under the PSK mode in the PSW. The storage they access is in blocks assigned PSK. At the same time, the PSK storage blocks may be changed by any program executing with any key value, including the PSK value. This is particularly useful for any family of programs and data having a base program which must have access to all programs and data in the family and which performs services for all members of the family, in particular those that require interactions with the operating family, in particular those that require interactions with the operating system, but there the base program needs to be protected from wild stores caused by any other non-base program.

For example, with a set of protect keys 0-15, the public storage key may have key value 9, the supervisory key may have key value 0, and the non-supervisory keys may have key values 1-8 and 10-15, for a total of 16 protect keys. Also, each of the storage protect keys 0-15 may have an associated fetch protect flag bit (FP), reference bit (R) and a change bit (C). Any protect key can be used as an access key located in the PSW (program status word) of a program, or as a storage protect key located in a storage array with an entry associated with each respective 4 KB block in a computer's main storage with that block's protection key.

The operating rules are that any non-supervisory key (1-8 and 10-15) user can access any public key (9) storage block. But no public key (9) user can store (or fetch if fetch protection is on) into any storage block protected by a supervisory key (key 0) or by an non-supervisory storage key (keys 1-8 and $10 \propto 15$).

Thus, a program executing with public access key 9 can only store into a block having PSK 9, regardless of the setting of the FP bit in the storage key. But fetching by a program having public access key 9 is controlled by the FP bit setting: If FP is 1 for any storage key, fetching is only permitted if equality exists (which restricts key 9 programs to accessing only storage blocks assigned PSK 9). But if FP is 0 in the storage key, fetching is permitted without equality (which allows public key 9 programs to access storage blocks assigned any storage key).

Programs assigned any non-supervisory key (1-8 and 10-15) or the supervisory key 0 can store or fetch into any PSK block (key 9) without equality, regardless of the state of the FP bit for the PSK block.

Nevertheless, highly used families of programs exist which run in a single address space without any isolation protection (even though the PC and related instructions and storage protection keys have been available) in order to obtain the fastest execution speed for such programs. Catastrophic data-integrity failures occasionally occur in such programs due to the lack of isolation between programs and data, which can exact a heavy price on businesses dependent on continuous and uninterrupted operation by such programs and data. Further, when data integrity violations occur, they usually are not found at the instant of occurrence, but are discovered later when they are noticed or cause erroneous results sometime in the future.

The PSK provided a means to address part of the isolation requirement. It allowed separation between the application programs and the base subsystem under whose control they execute, and on which they depend for services. The subject invention extends the isolation of the application code modules and data, protecting each one from all others. In the application of this invention to use virtual addressability to isolate each transaction in execution from all others, the PSK remains part of the total system solution by protecting the subsystem itself from all transactions, while allowing high performance direct access by it to the code and data of all transactions in performing its services.

SUMMARY OF THE INVENTION

The primary object of the invention is to provide a computer system method and means that maintains data and program integrity while enabling fast execution of a related group (family) of programs and data. In particular, the storage areas containing respective programs and data need protection from the wild stores of other programs, since wild stores can destroy a program and invalidate data. The fast performance objective is to approach the performance obtainable for a program family, as if it were contained within a single address space with no isolation against wild stores between the programs and data in the family.

To do this, the invention provides an identifier of the group to a CPU dispatching a program in the group. The group identifier does not change as long as the group dispatch remains active. The group identifier may be located in a control register in the dispatching CPU, or it may be an address to a memory control block containing the identifier.

The invention uses two new types of virtual address spaces (in addition to the existing "program space" and "data space" described above). Each of these address spaces is defined by a respective TTD. The new address spaces are: 1. A sub-address-space (herein called a "subspace"), which is a special type of program address space containing executable code, but which does not have an assigned ASN; and 2. A "base address space" (herein called a "basespace") is a program address space which additionally is associated with subspaces. A basespace may have any number of subspaces and has at least one subspace. The basespace is defined by its TTD. A new flag indication is provided in the TTD for identifying the two new types of address spaces.

Each basespace is assigned a unique ASN, and a subspace is not assigned any unique ASN. But, each subspace is considered to have the ASN of its related basespace. The basespace and all of its related subspaces are together considered an address space group or family. The base space ASN represents the whole group.

The speed of program execution is not slowed by control transfers between programs within the same address space, which can use an ordinary branch without the overhead of inter-space branches. Execution is slowed by the switching of execution from a program in one address space to a program in another address space, saving the authority and addressing states of the old program and establishing those required by the program in the second address space. Inter-space controls are exercised for maintaining the integrity of data and programs in both the address spaces during the switch of program control, so that a malicious or mistaken caller will not have authority to erroneously access the programs or data in the next address space, and vice versa.

The speed of address space switching is greatly improved over prior address space switching methods by a new problem-state branch instruction provided by this invention, called a "branch in subspace group" (BSG), which operates to switch CPU execution between programs in the different address spaces of the group (family) which includes a basespace and a plurality of subspaces.

The BSG instruction is an intra-group program call for branching from a program in a basespace to a program in a subspace, from a program in a subspace to a program in a basespace, and from a program in a subspace to a program in another subspace.

The intra-group program call approach of this invention avoids much of the overhead disadvantages of frequent use of the complete program call (PC) instruction for switching CPU control between the subspaces/basespace. This is possible because the assumptions of executing in a subspace group either do not require the checking controls of the formal PC interface, or provide for the same operating conditions on both sides of the control transfer so that new information is not required to set processor control registers. As particular examples, Extended Authority Index (EAX), PKM, PSW Key and problem state do not change. The linkage stack is not required to save information regarding these authority controls, or the GPR or AR values. For the latter, the register saving and restoring is an obligation to be addressed in the program linkage by the programs themselves. For the former, the isolation sought between members of the family is one of restricting their addressability to storage, and preventing and reporting erroneous stores, so as to contain the impact of such errors to the program containing the error. The basic authority characteristics remain the same across the family, with limited changes managed within the code of the family. An example of this is the PSW key, changed by the SPKA instruction as constrained by the PKM of the family. This invention avoids the complete PC instruction for use within a group, and restricts the need for use of the complete PC instruction to program calls made to program spaces outside of the group, where the standard inter-space isolation is required.

The subspaces do not have unique ASNs of their own, but are represented as required by the ASN of the basespace. This is explained in detail later. In the event of a PC from a non-group address space to the subspace group, the target ASN of the PC will call a program entry point in the basespace which, for this occurrence, represents the ASN.

Thus, the invention provides a method of transferring program control "within a group" of address spaces, in which the basespace acts as a server address space for the subspaces in the group. However, a program in a subspace in the group can make a program call to an address space outside of the group, but such a call must be a complete PC instruction since the simplified program call, Branch in Subspace Group, (BSG) can only be made inside of the group. When PC is used, the Program Return (PR) instruction will return control to the calling subspace.

initially, a program in the group is entered upon the dispatch of the group of address spaces. The dispatch uses a LASP instruction which performs ASN translation before starting execution of any program in the group. The load PSW instruction establishes the authority state conditions of the dispatched program. Then, the started program may use a BSG (branch in subspace group) instruction to call a program in the basespace or in any subspace in the group. The BSG instruction is an intra-group cross-space branch instruction which cannot be used to call programs outside the subspace group.

The BSG instruction uses a mechanism that restricts its use such that it can only be used to branch between programs that are in basespace/subspace types of address spaces in a single family group.

The invention enables the implementation of subspaces as address spaces subservient to a basespace, with minimum change to the current software structures. It enables a subsystem-application structure in which the subsystem may have addressability to all the programs executing transactions assigned to them by the subsystem, but restrict the addressability of each of these programs to their own storage, except for the capability to transfer control to designated entry points through a programming defined formal interface to obtain services from the subsystem, or to report unusual occurrences. The IBM CICS subsystem is an example of such a structure, which uses the previous PSK invention to protect itself from stores from translation application code, and will use this invention to provide addressing isolation between the transaction application programs.

In the ESA/390 environment, the BSG instruction execution uses the state of information in a DUCT (dispatchable unit control table) which is a memory block located by an address in a CPU control register. This invention provides fields in the DUCT to store identifiers for the basespace and the last entered subspace in the group, and to indicate if the current or last executed program in the group was in the basespace or in a subspace. This information is available so that if the execution of a program in the group is interrupted, the operating system (OS) is able to return control to the interrupted program when execution resumes for that program (such as when its next dispatch begins or the OS returns control after processing an interruption). Similarly, when a program outside the group is called by use of the PC instruction within the group, the DUCT retains the information as to whether control left the group from the basespace or the subspace, and, if a subspace, which one. On a subsequent PR which is to return to the calling program within the group, the DUCT is used to get execution control to the right space within the group.

Each subspace has a unique STD that locates the translation table(s) which defined the real addresses resulting from the translation of the virtual addresses in the respective subspace or basespace. The embodiment illustrates a use of the invention in which some part of each subspace is also addressable in the basespace. This is not required by the invention. A subspace group may be established, and BSG used to transfer execution control among the basespace and its subspaces, without any shared addressability between the basespace and any or all of the subspaces of the subspace group.

The invention provides a concept that an executing subspace or basespace in a group is registered in the CPU as both its current primary and secondary address space; this aids translation isolation by not providing a transaction with information for accessing its calling program in another address space. Thus, when a BSG instruction switches to a called subspace, the BSG execution sets both the CPU's primary and secondary STD fields (in CR1 and CR7 of an ESA/390 CPU) to the destination STD. This prevents CR7 from being used by the called program to access the storage of its caller. A subspace can only use BSG to transfer CPU execution control to an address space (internal to the group) for which it has explicit addressability through one of its access lists. Unlike the BSG instruction, the complete PC instruction (used as the program call between conventional address spaces) may be specified to save the STD of the calling address space in CR7 as the secondary STD, which can be used by the called program to access its calling program in another address space.

In summary, an object of the invention is to provide an intra-group program call instruction that relies on a predetermined authority relationship existing between a basespace and its related subspaces to eliminate most of the authority checks and other functions done by the complete program call instruction. The invention instead uses a streamlined access register translation to perform an intra-group program call. The intra-group program call relies on the authority checks initially made by the operating system dispatching program to dispatch the group, and repetition of these authority checks is eliminated by this invention for internal group program calls.

BRIEF DESCRIPTION OF THE DRAWINGS

FIG. 7 depicts an ESA/390 STD as an example of a TTD with a field indicating whether the space is part of a subspace group, and a dispatchable unit control table, addressed by a processor control register.

FIG. 9 shows the special checks in the Program Call, Program Transfer, Program Return, Set Secondary ASN, and Load Address Space Parameter instructions required for them to operate properly in a subspace environment.

DETAILED DESCRIPTION OF THE INVENTION

Figure 1:
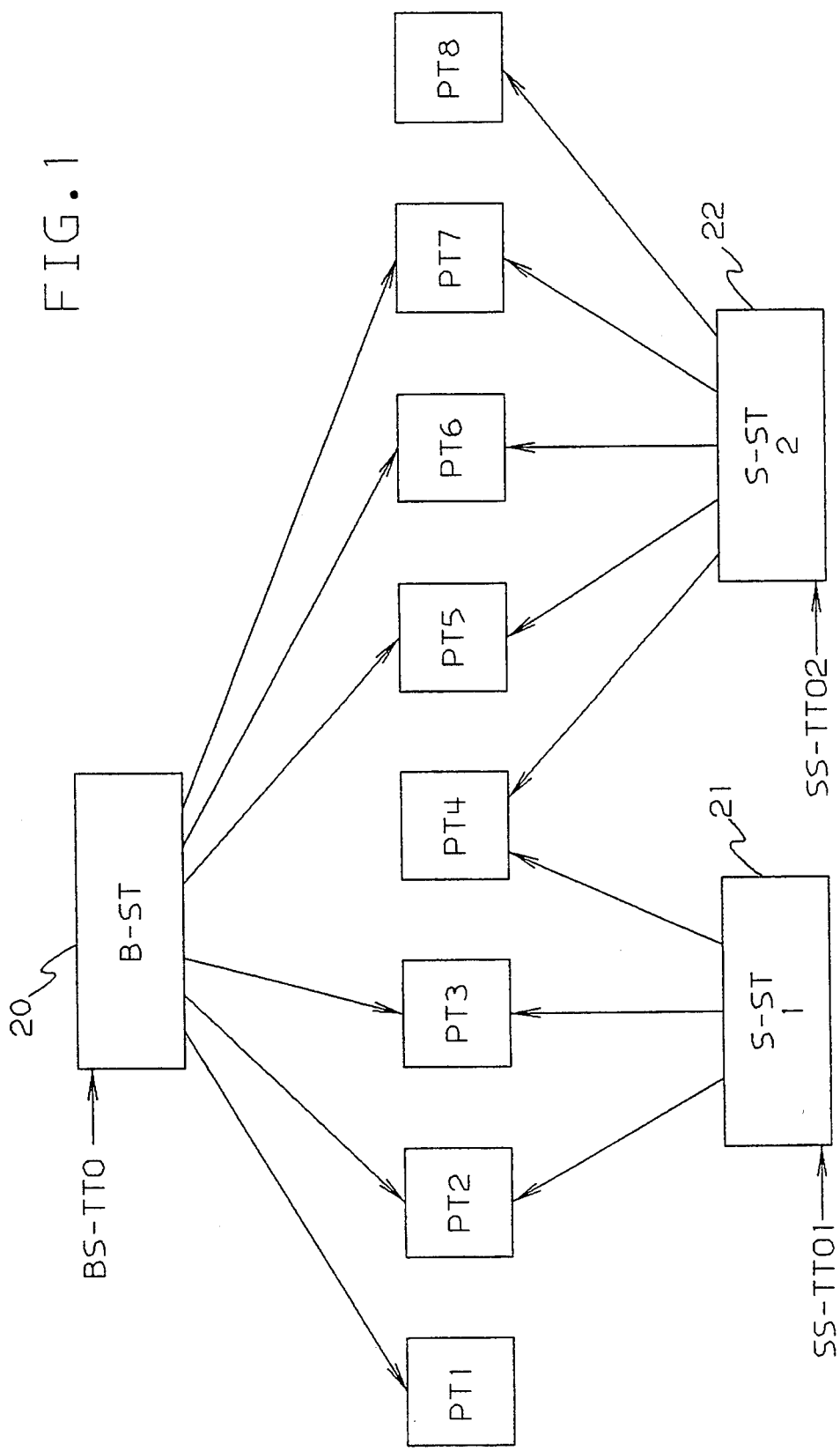
FIG. 1 represents group-related common (and uncommon) real addressing obtained by two levels of virtual address translation tables which may be used by the invention.
Figure 2:
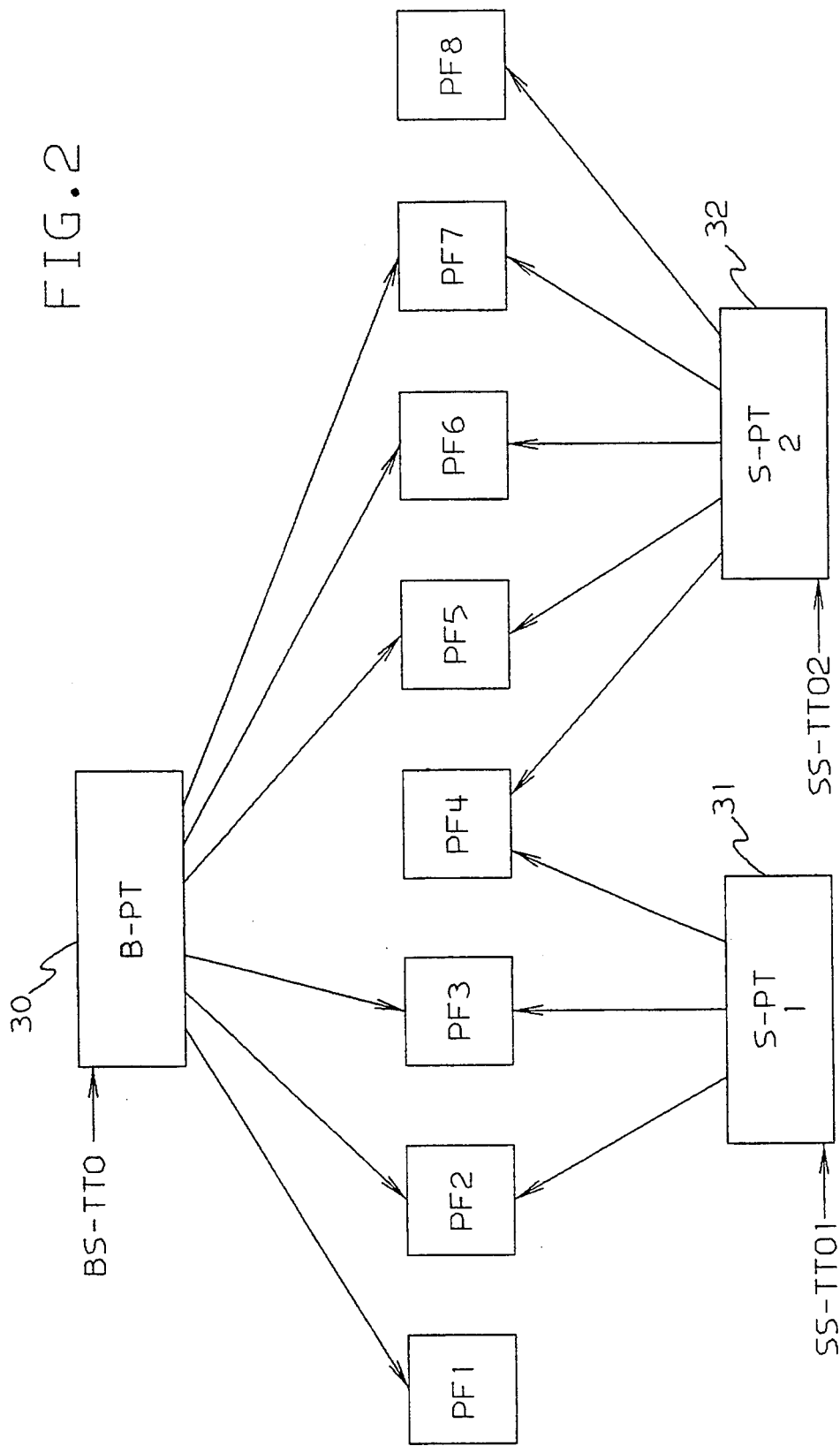
FIG. 2 represents group-related common (and uncommon) real addressing obtained by a single-level of virtual address translation tables which may be used by the invention.

FIGS. 1 and 2 provide examples of relationships among virtual-address translation tables which may be used by the invention. In each of these Figures, the highest level is obtained by accessing the TTD (translation table descriptor) for the respective address space.
Two Level Virtual Addressing for BS and SSs—FIG. 1:

The TTO in each TTD shown in FIG. 1 is an STO (segment table origin) which is the address to the segment table (ST) in main memory for a respective address space, either a basespace (BS) or a subspace (SS). The two-level translation operation is used by the preferred embodiment.

In the ESA/390 and S/370 architectures, the ST is the highest level of two-levels of virtual address translation tables, such as represented in FIG. 1. Each ST contains entries (STEs) for all of the segments defined for the respective address space. In FIG. 1, the basespace ST is called B-ST 20, and each subspace ST is called S-ST of which two are shown, S-ST1 21 and S-ST2 22.

Each ST contains segment table entries (STEs) which locate corresponding page tables (PTs) in memory that respectively define the segments of the address space. Each STE contains a page table origin (PTO) that addresses a respective page table (PT), which represents the addressability for that segment of the address space. In FIG. 1, the basespace is shown with six PTs (PT1–PT3 and PT5–PT7) which are addressed by six STEs in the B-ST 20.

The first shown subspace is represented by S-ST 21, which locates three PTs, which are PT2, PT3 and PT5. The second subspace is represented by segment table S-ST 22 that locates five PTs, which are PT4, PT5, PT6, PT7 and PT8. Note that PT1 is used only by basespace 20 and is not part of any subspace. And note that the second subspace 22 has PT8 which is not in common with the basespace 20 or any other subspace. Note, further that PT4 is in common with both subspaces, S-ST1 21 and S-ST2 22, but is not in common with the basespace B-ST 20.

Each PT has a plurality of page table entries (PTEs). Each PTE has an address, called a PFRA (page frame real address) which locates a respective 4 KB page frame in the real memory of the computer system. All of the PTEs that can be addressed through the STD of a respective address space define the portion of the system memory that can be addressed within the respective address space, which is usually less than all of the real memory.

Thus, FIG. 1 represents how related common (and uncommon) real addressing is obtained by two-levels of virtual address translation tables (STs and PTs), which may be used by the invention.
Single Level Virtual Addressing for BS and SSs—FIG. 2:

FIG. 2 represents related common (and uncommon) real addressing obtained by a single-level virtual address translation table structure, which also may be used by the invention. In FIG. 2, the basespace is shown with six page frames (PF1–PF3 and PF5–PF7) which are addressed by six PTEs in the B-PT 30. Note that PF1 is not part of any subspace.

The first shown subspace is represented by page table S-PT 31 which locates three PFs, which are PF2, PF3 and PF4. The second subspace is represented by page table S-PT2 32 which locates five PFs, which are PF4, PF5, PF6, PF7 and PF8. PF5 through PF7 are common with the basespace and PF8 is not in common with the basespace. Note further that PF4 is in common with both subspaces, S-PT1 31 and S-PT2 32, but not with the basespace B-PT 30.

As in FIG. 1, FIG. 2 also has each PT containing a plurality of page table entries (PTEs) and each PTE has an address, called a PFRA (page frame real address) which locates a respective 4 KB page frame in the real memory of the computer system. All of the PTEs that can be addressed through the PTO of a respective address space in FIG. 2 define the portion of the system memory that can be addressed by the respective address space, which is usually less than all of the real memory.

Figure 3:
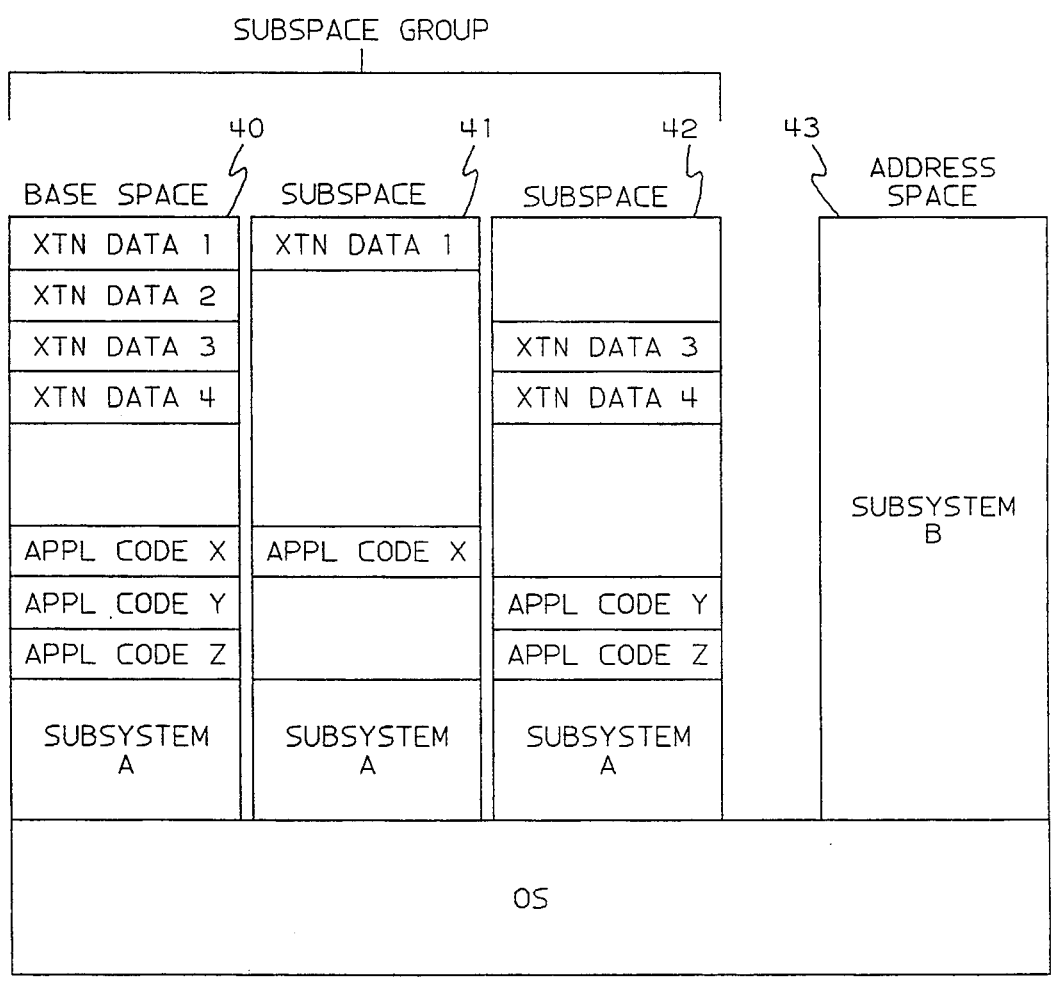
FIG. 3 shows an example of the addressability of a subspace group as it might be established in an operating system such as MVS/ESA.

Thus, FIG. 2 shows related common (and uncommon) real addressing obtained by a single level of virtual address translation tables (only PTs), which may be used by the invention.
Common Addressing Between Basespaces and Subspaces—FIGS. 3, 4 and 5:

FIG. 3 is an example of how the invention can be used in an operating system such as MVS/ESA. The address spaces in a subspace group are represented by columns 40, 41 and 42, in which column 40 represents the basespace, and columns 41 and 42 represent subspaces in the subspace group. Column 43 represents an address space that is not part of the subspace group. The control program of the operating system (OS) in this case is mapped into all address spaces it supports. In this example, the subspace group is structured around a common subsystem (subsystem A) which dispatches work to the subspaces and provides programmed services to programs running in the subspace group. Subsystem A is address mapped into the basespace and all subspaces, but not into address spaces outside the group.

Figure 4:
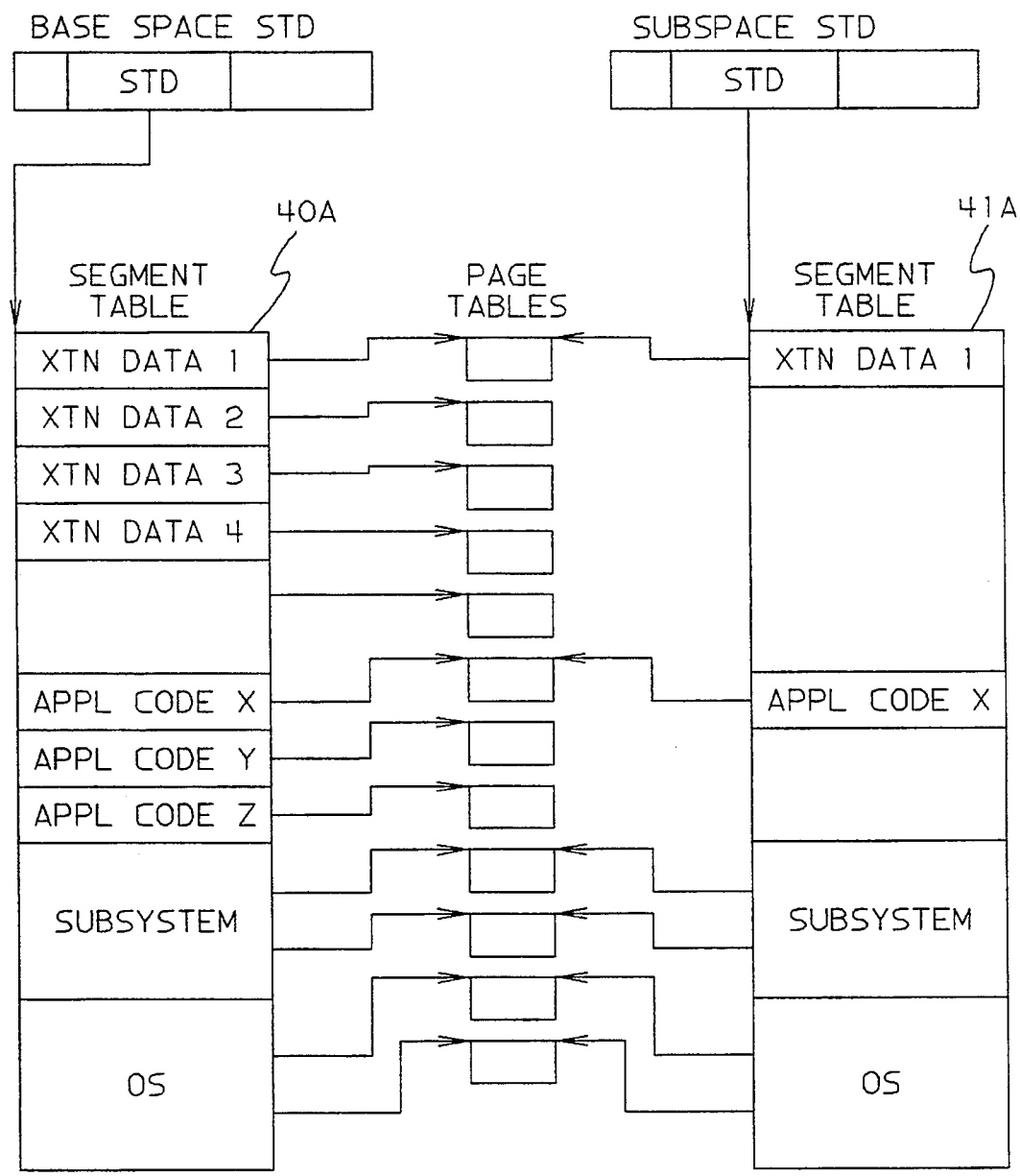
FIG. 4 illustrates how the basespace and one subspace of the subspace group of FIG. 3 can be established by the use of common page tables, in the manner of FIG. 1.

FIG. 4 illustrates how the addressability of the programming structure shown in FIG. 3 can be achieved in the ESA/390 addressing, in the manner of common page tables shown in FIG. 1. The addressing structure of the basespace 40 and one of the subspaces (41) of FIG. 3 are shown as 40A and 41A. Each address space has its own defining STD, and for the common segments, the appropriate segment table entries in each address the same page tables.

Figure 5:
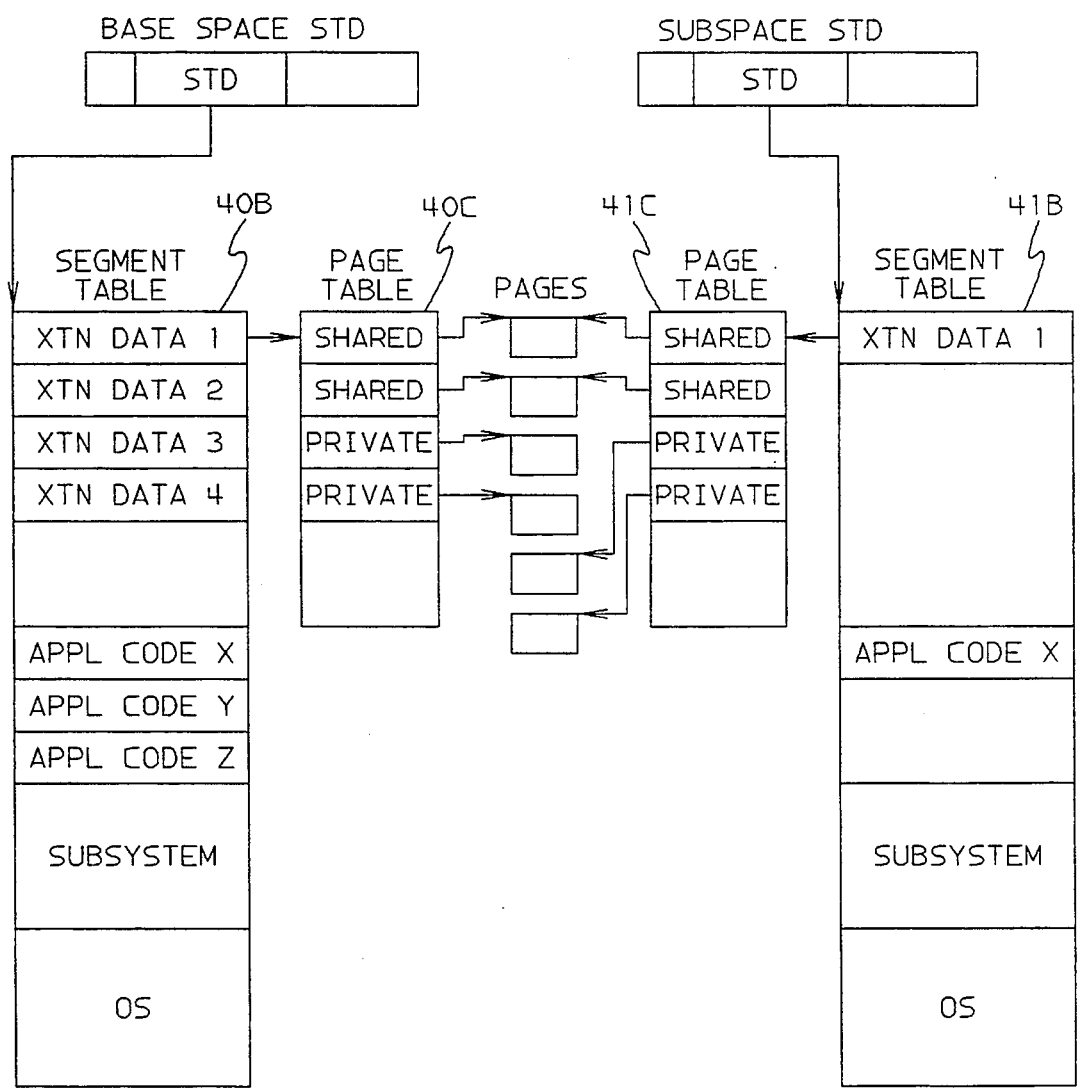
FIG. 5 illustrates how the basespace and one subspace of the subspace group of FIG. 3 can be established by the use of common page table entries, in the manner of FIG. 2.

FIG. 5 is an example of how the addressability of FIG. 3 can be achieved on an individual page basis as described generally for FIG. 2. Here the page tables 40C and 41C cannot be shared but individual virtual pages may have their address in both address spaces translate to the same page frames. The potential for the granularity of the sharing is reduced from a full segment to single individual pages.

Figure 6:
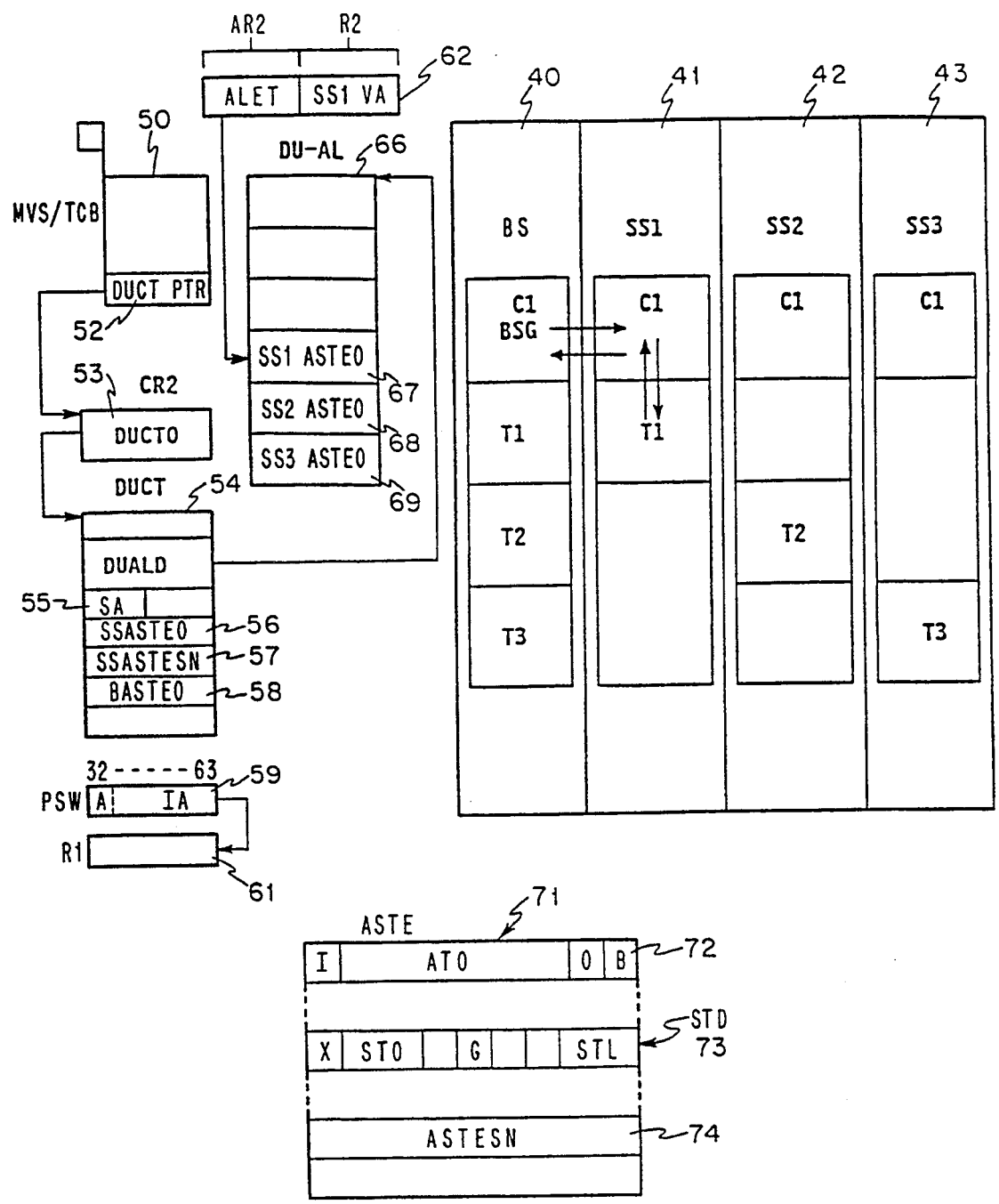
FIG. 6 provides an example of a virtual addressing structure showing a group having a basespace and related subspaces and related control blocks used in the address space switching of program control among the basespace, and subspaces.

Basespace to Subspace Relationship—FIG. 6:

In FIG. 6, the address spaces in a group are represented by columns 40–43, in which column 40 represents the basespace, and columns, 41, 42 and 43 represent respective subspaces SS1, SS2 and SS3. Two level translation tables are used with this preferred embodiment. Hence, basespace 40 has a segment table and each of subspaces 41, 42 and 43 has a respective segment table. The segment table designation for the basespace and for each subspace is found in its respective ASTE.

The basespace 40 contains programs C1, T1, T2 and T3 addressed through respective page tables PT1, PT2, PT3 and PT4. Program C1 in PT1 is common to all address spaces 40, 41, 42 and 43. Program T1 in PT2 is common only to the basespace 40 and to subspace 41; program T2 is common only to basespace 40 and to subspace 42; and program T3 is common only to basespace 40 and to subspace 43. To be commonly addressed, a PT must be addressed by valid STEs in the appropriate STs. (Four programs are shown in FIG. 3 to simplify the drawing for explaining the principles of the invention, since an actual system cannot possibly be shown in patent drawings, since dozens, hundreds or thousands of programs and data areas may be found in a single subspace and reflected in its basespace.)

The structure of address spaces 40–43 prevents any program executing in one address space from sending or receiving a wild store to or from any other address space, except for the areas of the address spaces that are accessible in common. For example, subspace 42 can only access storage blocks C1 and T2, and subspace 42 cannot access storage blocks T1 and T3, so that blocks T1 and T3 are protected from wild stores from block T2 executing in subspace 42. Blocks T1 and T2 are protected from wild stores from block T3 in subspace 43. Similarly, T2 and T3 are protected from T1 executing in subspace 41.

Blocks in the C1, T1, T2 and T3 areas in basespace 40 are addressable in common with these blocks in their respective subspace 41, 42 and 43. Hence, the basespace and each subspace can only access programs and data in blocks common to them, which are the blocks addressable through the segment translation table of the respective address space, in the manner illustrated in FIG. 1.

In an alternate use of this invention, a subspace group can be established without requiring any common addressability among the address spaces of the subspace group.

Additional Protection by Using the Public Storage Key:

This invention enables the public storage key type of storage protection to be combined with the group address space type of storage protection to obtain the most effective protection against wild stores, which is provided in the preferred embodiment of the subject invention. The public storage key protection complements the address space protection because the key protection operates within any address space, including a basespace or any subspace, while address space protection operates between the address spaces. Thus, the unique content of each subspace may be assigned to PSK, while code or data common to some or all subspaces can be assigned a different storage key.

There is only one actual storage block C1 in real memory, which is used in common by all the address spaces in the group because block C1 is in all segment tables of all address spaces in the group. C1 is protected by not being assigned the PSK.

If C1 contains a common set of subsystem services, including data buffers containing information for more than one transaction code, which is mapped into all subspaces, the transactions may be assigned to and executed in the PSK. The common code and data buffers could be assigned another storage key and, thus, be protected against stores from all transactions. However, since the transactions and their private data areas are assigned the PSK the subsystem services may directly access these in the performance of requested services requiring either fetches or stores to a specific transaction area.

The PSK assignment prevents the program(s) in the PSF block(s) from storing into any of the other storage block(s) within the same subspace, for which block(s) T1, T2 and T3 are assigned the PSK. Then wild stores generated by any T program could not reach any block assigned another protect key within the same subspace, for example, the subsystem C areas. But, the T blocks (with PSK assignment) could be accessed by all programs in storage blocks having another key assigned within the same subspace. Thus, blocks T1, T2 and T3 are not protected from the wild stores of the other blocks assigned different protect keys, but these are assumed to be relatively stable and well-tested modules of a major service subsystem. However, the subspace structure protects the T areas from wild stores by each other. This is accomplished in the subspace structure by denying them addressability to each other. In summary, in a structure of a common subsystem service provider and multiple transactions using the common services, the transaction areas are protected by the limited addressability of the subspace without losing the direct addressability of the services code to the transaction storage areas, while the common service subsystem, mapped to be addressable in all subspaces, is protected by assigning each transaction area the PSK as its protect and access key, while the subsystem has a different protect and access key.

Translation Table Designation for Related Address Spaces:

In the preferred embodiment, the TTD is an STD (segment table designation), which is shown as word 73 in ASTE 71 in FIG. 6. The STO (segment table origin) is the field in the STD which contains the real address of the segment translation table in the computer's main storage. And the STL is a field in the STD which indicates the length of the segment translation table.

The STD also contains a new flag field (G bit) to indicate whether the STD defines an address space in a group of address spaces. If G=1, the STD defines an address space in a subspace group. If G=0, the address space is not in a subspace group.

If the field G indicates a group exists for an STD, the ASTE containing the STD also has a flag field, B (which is field 72 in the ASTE 71 in FIG. 3) that indicates whether the STD represents a basespace or a subspace type of group address space. If B=1 the STD represents a basespace, and if B=0 the STD represents a subspace.

Branching Between Programs in Different Address Spaces Of The Same Subspace Group:

An executing program is able to branch to any instruction in the same or in any other address space in the related subspace group by using the BSG instruction. The BSG instruction is restricted to operate within the single subspace group it is executing in. Except for addressability, a task executing within a subspace group has common authorization attributes regardless of which subspace of the group it is in at any one time, unless the task uses program steps, using defined architecture, to change such attributes, e.g., PSW access key. Also, the instruction is defined to operate as other branches of ESA/390 in that the saving and restoring of registers (GRs and ARs) are the responsibility of the programs involved in the linkage. This allows local optimization for performance in these linkages. A subspace group is assumed to contain a set of related programs with an overall unified design for intercommunications. On the other hand, the formal mechanisms of ESA/390 (PC, PR, PT) assume that a stringent isolation is required, and that major programming subsystems desire complete independence from their service callers or callees. Thus, they impose more elaborate authorization checks and/or save and restore much more architected information. For example, the ESA/390 PC instruction takes many more memory accesses while in the process of performing a branch to another address space than the BSG instruction.

Branching Using ART:

The essence of the BSG instruction of this invention is its use of an abbreviated type of access register translation (ART) process for a program branch with space switching in a subspace group. The prior branch instructions with space switching (e.g. PC/PT/PR) did not use the ART process, but they used PC number translation followed by ASN translation which together included many authorization checks not found in the ART process. The ART process was not previously used for program branch control. That is, the ART process previously was used only for accessing data (operands) in different address spaces during program execution.

A discovery by this invention is that when a program in one address space must call another in another address space, and the control transfer is between related addresses spaces in a subspace group, that their interrelationship allows the elimination of most of the checks used by the prior branch instructions with space switching (e.g. PC-ss instruction) without compromising the authority verification of the calling program to cause execution of the called program. These checks are disclosed in the previously cited prior application Ser. No. 07/732,936 (PO984011).

Resources Used By the Branch in Subgroup (BSG) Instruction:

The branch in subspace group (BSG) instruction has the simple form: BSG R1, R2 in which BSG is the opcode, and R1 and R2 are general purpose registers in the CPU containing operands used in executing the BSG instruction. The R2 general purpose register contains the destination address, and the access register (AR2) associated with R2 contains an ALET that represents the destination address space. R1 receives the address of the instruction following the BSG instruction for defining the return point after the program call completes at the R2 address.

FIG. 6 represents some of the important elements used in the preferred embodiment's CPU execution of the BSG instruction. The general purpose registers R1 and R2 may, for example, be any of the 16 general purpose registers in an ESA/390 central processor, in which an access register (AR) is associated with each of the 16 general registers. The AR associated with register R2 is called AR2. If R2 is specified as zero, the AR2 content is considered to be ALET 0. See R1 61 and R2 62 in FIG. 6. The AR1 associated with R1 is not used by the BSG instruction. AR2 contains an ALET (access list entry token), which in the prior art is comprised of a P bit, an ALESN (access list entry sequence number), and an ALEN (access list entry number). Only the P-bit and ALEN is used by the BSG process in the preferred embodiment; the ALESN is not used. FIG. 6 shows AR2/R2 initialized for the BSG to pass control from space 40 to space 41. As part of the BSG instruction execution, R1 61 receives the virtual address of the instruction following the BSG, as indicated.

The definition of a subspace group of address spaces, involving the storing of an identifier of the group in the dispatching CPU, is a prerequisite for tasks executing in the group to be able to execute BSG instructions. In an ESA/390 system, a program task is a unit of work dispatched by a software operating system (such as MVS). A task control block (TCB) 50 is provided for each task to be done by the computer system. An IBM MVS TCB is illustrated in FIG. 6. The TCB and several associated control blocks are generated by the operating system software before the dispatch can be done. Other control blocks initially generated in main memory by the operating system include a DUCT (dispatchable unit control table) for each dispatchable unit, and a DU-AL (dispatchable unit access list) illustrated in FIG. 6.

During the dispatching process for a task, the DUCT pointer of the task (PTR 52) is loaded into the dispatching CPU's control register 2 (CR2) for locating the DUCT in main storage. The DUCT contains a DUALD (dispatchable unit access list designation) which has a pointer (which is a real address) that locates the DU-AL 66 in the main memory of the computer system. The DU-AL contains a set of AL entries (ALEs) which contain the real addresses for locating the ASTEs which respectively represent all subspaces (SS1, SS2 and SS3) in the group. A particular subspace is obtained by the ALEN content in AR2 62 of the current BSG instruction, which selects the destination ALE (e.g. for SS1) that addresses an ASTE 71 which designates the destination subspace of the BSG program call. This destination ASTE contains an STD field that contains the destination STD, which defines the subspace which is to be entered by the BSG instruction. The P-bit in AR2 may be used to direct the above process to the PS-AL instead of the DU-AL.

A modified ART process is used to translate the ALET specified as part of the BSG second operand. ALETs 0 and 1 have a special meaning described below. The ALESN in the ALET and the ALE are not compared. They are ignored. There is no authorization check on use of the ALE, i.e. the ALEAX in the ALE and the EAX in a CPU control register, the private bit in the ALE, and the ESA/390 Authority Table designated from the destination ASTE are all ignored.

R1 61 receives the content of PSW bits 32-63 (the addressing mode and instruction address) and CR1 is loaded with the STD obtained from the destination ASTE 71. Bits 32-63 of R2 of the BSG are loaded into PSW bits 32-63.

The CRs, AL, its ALEs, and the ASTEs have the form and manner defined in the prior art, as is found in the ESA/390 Principles of Operation (form number SA22-7201-00) which is fully incorporated by reference into this specification, except as extended by this specification.

FIG. 6 shows how the DUCT is modified by this invention to contain new fields 55, 56, 57 and 58 as shown in FIG. 6, which respectively have the following content: SA (subspace active bit), and SSASTEO (last subspace ASTE origin), the SSASTESN when the current SSASTEO value was placed in the DUCT, and the BASTEO (basespace ASTE origin). The SSASTESN is a sequence number used for checking that the expected SSASTE has not been changed; accessing authority to the associated address space can be withdrawn by the operating system merely by changing the value of the ASTESN in the subspace ASTE. The BASTEO identifies the basespace of the currently dispatched task and BASTEO does not change as long as the task is dispatched on the CPU because the basespace does not change during subspace group operation. The SSASTEO identifies the last subspace in which the task was executing or is being executed. The SA bit is set to one when a task executes in a subspace; and SA is set to zero when a task executes in the basespace. This information enables each next dispatch of a task to determine in which address space the task was executing at the end of the last dispatch. This is done by the LASP instruction which reads the address in the BASTEO or SSASTEO field according to the state of the SA bit. The old program PSW from the last dispatch's interruption contains the last address in the last executing program, so that each next dispatch can continue program execution from the instruction where the last dispatch ended. The DUCT is addressed by the content of a control register containing DUCTO (DUCT origin). The DUCTO in a control register does not change while a dispatchable unit or task is dispatched on a CPU.

Figure 8:
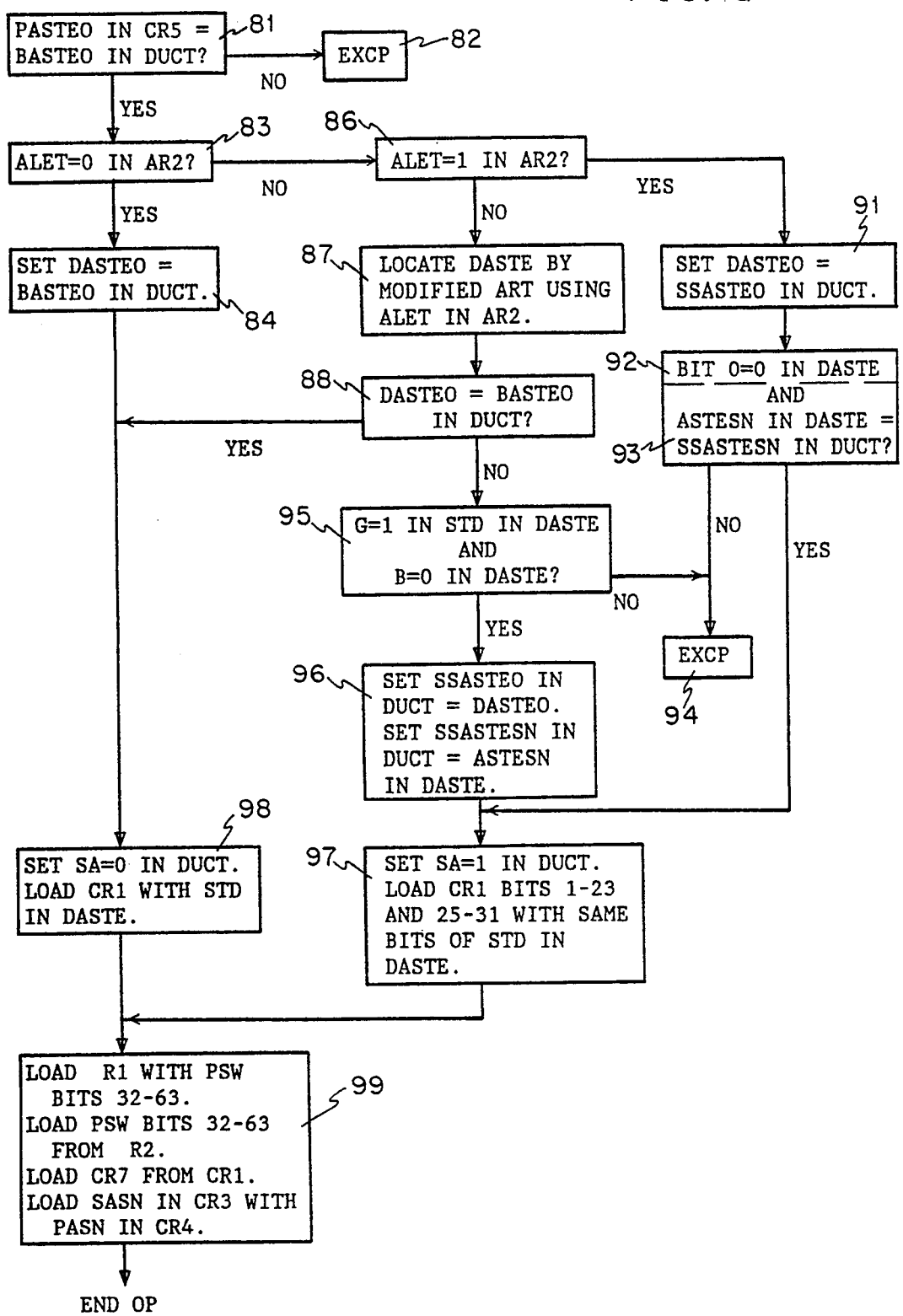
FIG. 8 is a flow diagram of CPU (central processing unit) execution of a BSG (branch in subspace group) instruction.

FIG. 7 depicts a segment table designation of the ESA type with a group membership indicator defined. Operation of BSG Instruction—FIG. 8:

FIG. 8 is a flow diagram representing the operation of the BSG instruction.

Step 81 tests that the BSG is being executed inside of the subspace group by comparing the current PASTEO to the BASTEO in the DUCT. They will be equal during execution in the basespace or any subspace of the subspace group, but not equal if, for example, a PC was used to execute a program outside the subspace group and execution control has not returned to the group. If they are not equal, the BSG is not allowed and an exception is signalled at step 82. ALET 0 in BSG operation causes return to the basespace from a subspace. ALET 1 in BSG operation transfers control from the basespace to the last subspace that had control.

Step 83 tests for ALET=0, which represents the basespace. If the specified ALET=0, the destination ASTE (DASTE) is the basespace. SA in the DUCT is set to zero (subspace not active) and CR1 is loaded with the STD from the ASTE at BASTEO. Go to step 99 for PSW and other CR loading.

Step 86 tests for ALET=1, which value represents the current or last subspace of the group in execution. If the specified ALET=1, the SSASTEO in the DUCT is the DASTEO of the BSG at step 91.

Step 92 tests for a valid ASTE and step 93 tests that the ASTESN in the DASTE addressed by SSASTEO is equal to SSASTESN in the DUCT. If step 92 finds invalidity or step 93 finds inequality, an exception is raised at step 94.

Otherwise, at step 97, SA is set to one to indicate subspace active, and CR1 is loaded with the appropriate bits of the STD of the destination ASTE. Bits 0 and 24 of CR1, which are the space-switch-event control and the storage-alteration event control (both of which are described in the ESA/390 Principles of Operation) are left unchanged since they are considered to apply to the base space and all subspaces in the subspace group. Control goes to step 99 for PSW and other CR loading. Step 87 is entered if the ALET value is neither 0 nor 1. Here the destination ASTE is found by ART using the ALET in the AR2 specified in the BSG instruction. If the DASTEO=BASTEO address in the DUCT, the basespace is the target of the branch and control goes to step 98, previously described.

Step 95 tests that the destination space is part of a group and is not another basespace. If not a member of a group or if a different basespace, an exception is raised at step 94. Step 96 establishes DUCT fields for subspace execution by setting the SSASTEO field to the DASTEO of the BSG, and the SSASTESN field to the value of the ASTESN of the DASTE. Control then goes to step 97, previously described.

At step 99, R1 is loaded with PSW bits 32-63 to provide the return addressing mode and address, PSW bits 32-63 are loaded from the R2 specified in the BSG as the new addressing mode and instruction address, the secondary space is set to the new primary and the secondary ASN is set to the PASN. Making CR7 equal to CR1 and the SASN equal to the PASN eliminates the ability of the destination program to have direct addressability to its caller, providing address isolation between the address spaces.

The operation of the BSG instruction is complete and the processor goes on to execution of the next instruction, specified by the PSW and CR1.

FIG. 9:

The subspace group facility affects the operations of the following ESA/390 CPU instructions: PC—Program Call; PT—Program Transfer; PR—Program Return; SSAR—SET Secondary ASN; and LASP—Load Address Space Parameters.

The additional definitions are described in a general way as follows. Whenever an address space is established as the primary address space or the secondary address space, then if the address space is part of a subspace group (as indicated by the G bit being one in the STD for the address space), and subspace mode is active (as indicated by SA being one in the DUCT), the ASTEO for the address space is compared to the BASTEO in the DUCT. If that ASTEO and the BASTEO are equal, the SSASTEO in the DUCT is used to locate the SSASTE. If bit 0 of the SSASTE is zero, the SSASTESN in the DUCT and the ASTESN in the SSASTE are compared. If equal, bits 1–23 and 25–31 of the STD for the address space (in CR1 or CR7) are replaced by the same bits of the STD in the SSASTE.

For PC, PT, PR and SSAR, an exception is recognized if bit 0 in the SSASTE is one, or if the SSASTESN in the DUCT and the ASTESN in the SSASTE are not equal. For LASP, the exception is not recognized. Instead, a condition code is set depending on the address space being established. Condition code 1 is set when the primary space is being established and condition code 2 is set when the secondary address space is being established.

While the invention has been described with reference to the preferred embodiments thereof, various modifications and changes will become apparent to those of skill in the art which may be made without departing from the true spirit and scope of the invention as defined by the appended claims.

What is claimed is:

1. A method for quickly branching to target instructions in a sequence of programs located in multiple virtual address spaces, the programs executing in a CPU of a computer system having a system memory and an operating system (OS), the branching method performed by the CPU comprising the steps of:

locating in system memory a subspace control block associated with the sequence of programs, storing an address (BASTEO) in the subspace control block for identifying a base address space (base space), and also storing in the subspace control block a list address (DUALD) for identifying a subspace list for identifying any number of subordinate address spaces (subspaces) associated with the base space identified in the subspace control block, the basespace and the subspaces together comprising a subspace group of address spaces, fetching and executing instructions located in multiple address spaces in the subspace group, including fetching a branch-in-subspace-group (BSG) instruction in a portion of the sequence of programs in the base space, or in an associated subspace, the BSG instruction containing a subspace operand having a subspace virtual address and an associated subspace representation, branching by the BSG instruction, including the steps of locating a subspace identifier by indexing a component of the subspace representation in the subspace list, and using the subspace identifier to locate an associated subspace address translation table, translating the subspace virtual address in the subspace address translation table to obtain an address of a target instruction in a target subspace for the BSG instruction, and fetching the target instruction in system memory, terminating execution for the BSG instruction if the target instruction is not located in any address space of the subspace group from which the BSG instruction is fetched, and continuing execution of the BSG instruction only if the terminating step finds the target instruction is within any address space of the subspace group.

2. A branching instruction method, as defined in claim 1, for enabling a CPU to quickly branch to a target instruction located in any virtual address space of the subspace group, in which each address space is identified by an address located in or through the subspace control block for obtaining a translation table descriptor (STD), the method being performed by the CPU further comprising the steps of executing an authorization process by a prior instruction initially entering the base space of the subspace group for entering the sequence of programs to be executed, storing in the subspace control block a primary space address (PASTEO) for locating a primary space containing instructions to be next executed, also storing the primary space address in a subspace identifying location (BASTEO) in the subspace control block as an identifier of the base space upon initially entering the base space, fetching a BSG instruction from any subspace and executing the BSG instruction in the CPU for branching to a target instruction, the terminating step further comprising the steps of comparing the address (PASTEO) currently stored for the primary address space for the fetched BSG instruction and the address (BASTEO) in the subspace control block for identifying the base space associated with the program, testing if the target instruction of the BSG instruction is in an address space within a subspace group, and continuing execution of the BSG instruction only if the comparing step finds the compared addresses are equal.

3. In a computer system having a CPU, a system storage, and an operating system (OS), said CPU capable of performing a unit of work called a dispatchable unit (DU) by executing a sequence of instructions in a virtual address space specified by a segment table designation (STD) in a first control register of the CPU, said CPU having an instruction address register (PSW) containing the address of the next instruction the CPU will execute, said OS having a control block (ASTE) for each of a plurality of virtual address spaces and a control block (DUCT) for each of a plurality of DUs, said CPU having a second control register containing an address of a DUCT for a currently performed DU, and said CPU having a first instruction means for transferring instruction execution for a currently performed DU from the DU's current (origin) address space to a branch address in a destination address space to perform either a calling or a return program linkage, with said first instruction means authorized by, and setting authority-determining system state as determined by, attributes of the DU and of the origin and destination address spaces, and with said first instruction means finally loading an STD from the ASTE for the destination space into said first control register and loading the branch address into said PSW, a method for more quickly transferring a DU within a restricted set of equally authorized address spaces called a subspace group, said method comprising the steps of:

storing by the OS in the DUCT for the DU a list of identifiers of address spaces that constitute a subspace group to which the DU is authorized, and transferring execution for the DU from an origin address space to a destination address space by a second instruction means, with said second instruction means called Branch in Subspace Group (BSG), with BSG authorized simply by that the origin and destination spaces are both in the DU's subspace group as indicated by the list of address space identifiers in the DUCT for the DU, and with BSG not setting any system state except for finally loading an STD and branch address the same as the first instruction means.

4. In a computer system as in claim 3, with the address space specified by the STD in said first control register called the primary address space and with that STD called the PSTD, with the CPU further having a third control register containing an address (PASTEO) of the ASTE from which the PSTD was obtained, with said first instruction means, when it transfers execution for a DU to a new primary address space, loading not only a new PSTD into the first control register but also a new PASTEO into the third control register, the method further comprising the steps of:

selection by the OS of one address space in the DU's subspace group as an address space called a base space, with the other address spaces in the group then called subspaces, storing by the OS of an address (BASTEO) of the ASTE for the base space in the DUCT for the DU, loading by the OS of the BASTEO into the third control register as the PASTEO when it dispatches the DU in any address space of the DU's subspace group, leaving PASTEO in the third control register unchanged by BSG when BSG transfers the DU from one address space to another in the DU's subspace group (even though BSG changes the PSTD in the first control register), thus causing all address spaces in the group to be equally authorized as determined by the ASTE for the base space, and checking by BSG that PASTEO in the third control register equals BASTEO in the DUCT and recognition of an exception if they are not equal, thus assuring that BSG is executed only in the DU's subspace group since the first instruction means may have been used to transfer out of the group, which would have changed the PASTEO.

5. In a computer system as in claim 4, with the CPU further having access registers, an access register mode, and access register translation such that an access list entry token (ALET) in an access register can be used in the access register mode to locate an entry in an access list, which entry in turn locates an ASTE containing an STD, and which STD then is used for translating the address of a data access made to an address space that may be different from the primary address space, and with the OS providing an access list and storing a pointer to the access list in the DUCT for the DU, the method further comprising the steps of:

storing by the OS of a first indicator in an ASTE or in the STD in the ASTE, said first indicator indicating whether the address space corresponding to the ASTE and STD is in a subspace group of any DU, use by BSG of an ALET and access register translation to locate the ASTE and STD for the destination address space whether or not the CPU is in the access register mode, and checking by BSG of said first indicator in the ASTE or STD for the destination address space and recognition of an exception if the destination address space is not in a subspace group, thus preventing BSGing to an address space that is accessible through the access list only for accessing data in that address space.

6. The method of claim 5, further comprising the step of checking by BSG, after BSG has located the ASTE for the destination address space, whether that ASTE is the ASTE identified by the BASTEO in the DUCT, and if it is, omitting the checking of said first indicator since there is no need to check whether the destination address space is in a subspace group if it is known that address space is the base space for the DU.

7. The method of claim 5, further comprising the steps of:

storing by the OS of a second indicator in an ASTE or in the STD in the ASTE, said second indicator indicating whether or not the address space corresponding to the ASTE and STD is the base space of a subspace group of any DU, and if BSG finds that the ASTE for the destination address space is not the ASTE identified by the BASTEO in the DUCT, then checking by BSG of said second indicator in the ASTE or STD for the destination address space and recognition of an exception if the destination address space is a base space of a subspace group, thus preventing BSGing to a base space that is not the base space of the DU but is accessible through the access list for accessing data in that base space, with said checking of said second indicator occurring either before or after the checking of the first indicator.

8. The method of claim 5, further comprising the steps of:

recognition by BSG of a special ALET, for example ALET 0 (an ALET having the value 0), as designating the base space, and when BSG uses ALET 0, location by BSG of the ASTE for the destination address space by means of the BASTEO in the DUCT instead of by means of access register translation, thus avoiding storing by the OS of an entry for the base space in the access list.

9. The method of claim 4, further comprising the steps of:

when a DU uses BSG to transfer from either the base space or a subspace of the DU's subspace group to a subspace of the group, storing by BSG in the DUCT for the DU an address (SSASTEO) of the ASTE for the destination subspace and setting by BSG of a subspace-active indicator in the DUCT to the one state to indicate that the last executed BSG entered a subspace (called the subspace-active state), when a DU uses BSG to transfer from either the base space or a subspace to the base space of the DU's subspace group, setting by BSG of a subspace-active indicator in the DUCT for the DU to the zero state to indicate that the last executed BSG entered the base space called the subspace-inactive state), when a DU uses the first instruction means of claim 3 to transfer from the base space or a subspace of the DU's subspace group to an address space not in the group, leaving unchanged by said first instruction means the SSASTEO and subspace-active indicator in the DUCT for the DU, when a DU uses said first instruction means to transfer from an address space not in the DU's subspace group to either the base space or a subspace of the DU's subspace group, use by the first instruction means of an identifier of the base space for identifying the destination address space (even if the destination space is a subspace), and then after the first instruction means has located the ASTE for the identified destination space and loaded a new PSTD into the first control register of claim 4 and a new PASTEO into the third control register of claim 4, checking by the first instruction means for whether the first indicator of claim 5 indicates that the identified space is in a subspace group, the subspace-active indicator is one in the DUCT for the DU, and the ASTE for the identified space is the ASTE identified by the BASTEO of claim 4, and if all those three conditions are met, loading by the first instruction means of an STD from the ASTE identified by the SSASTEO in the DUCT into the first control register, thus allowing the first instruction means to use only identifications of address spaces that are not subspaces, which beneficially results in that the subspaces do not consume the code points of those identifications and in that the first instruction means loads the address of the ASTE for the base space into the third control register as the PASTEO when it transfers to either the base space or a subspace.

10. The method of claim 9, further comprising the steps of:

when a DU uses BSG to transfer from either the base space or a subspace of the DU's subspace group to a subspace of the group, storing by BSG in the DUCT for the DU not only a SSASTEO and a subspace-active indicator but also a copy (SSASTESN) of a sequence number (ASTESN) the OS has placed in the ASTE for the destination address space, and when a DU uses the first instruction means to transfer to a subspace of the DU's subspace group (by means of an identifer of the base space when the DU is subspace active), checking by the first instruction means that the SSASTESN in the DUCT equals the ASTESN in the ASTE for the subspace and recognition of an exception if they are not equal, which allows a transfer to the subspace to be prevented by means of changing the ASTESN in the ASTE for the subspace without concern for whether that ASTE is identified by a SSASTEO in a DUCT.

11. The method of claim 9, further comprising the steps of:

recognition by BSG of a special ALET, for example ALET 1 (an ALET having the value 1), as designating the subspace that was last transferred to by means of BSG, and when BSG uses ALET 1, location by BSG of the ASTE for the destination address space by means of the SSASTEO in the DUCT instead of by means of access register translation, thus allowing control to have been transferred previously from a subspace (the last entered subspace) to the base space and now back to the same subspace.

12. The method of claim 11, further comprising the step of recognizing an exception, when BSG uses ALET 1, if the SSASTEO in the DUCT is all zeros, since the absence of a nonzero address in the SSASTEO field indicates that BSG has not yet been used to transfer to a subspace.

13. The method of claim 10, further comprising the steps of:

recognition by BSG of a special ALET, for example ALET 1 (an ALET having the value 1), as designating the subspace that was last transferred to by means of BSG, when BSG uses ALET 1, location by BSG of the ASTE for the destination address space by means of the SSASTEO in the DUCT instead of by means of access register translation, and then checking by BSG that the SSASTESN in the DUCT equals the ASTESN in the ASTE for the subspace and recognition of an exception if they are not equal, which allows a transfer to the subspace to be prevented by means of changing the ASTESN in the ASTE for the subspace without concern for whether that ASTE is identified by a SSASTEO in a DUCT.

14. The method of claim 4, further comprising the step of formation by the OS of dynamic address translation tables so that if a virtual address can be translated, it is translated to the same real address regardless of whether the virtual address is in the base space or any subspace of a subspace group but so that each subspace is a different subset, in terms of the virtual addresses it maps to real storage, of the base space, which can result in that a program in the base space has access to every subspace, but a program in a subspace does not have access to any other subspace or at least does not have access to certain parts of all other subspaces, thus preventing a program in a subspace from damaging programs or data in any other subspace.

15. In a computer system as in claim 4, with the CPU further having a fourth control register containing a secondary STD (SSTD) that is used for address translation in a secondary space mode of the CPU, and with said first instruction means setting the SSTD equal to the old PSTD during a calling linkage so that the called program can access the calling program's address space if the called program enables the secondary space mode, the method further comprising the step of:

setting by BSG the SSTD equal to the new PSTD so that the called program cannot access the calling program's address space by means of the secondary space mode, thus protecting the calling program from the called program.

* * * * *